March 23, 1965   A. F. ERICKSON   3,174,286
MASTER CYLINDER
Filed June 27, 1963
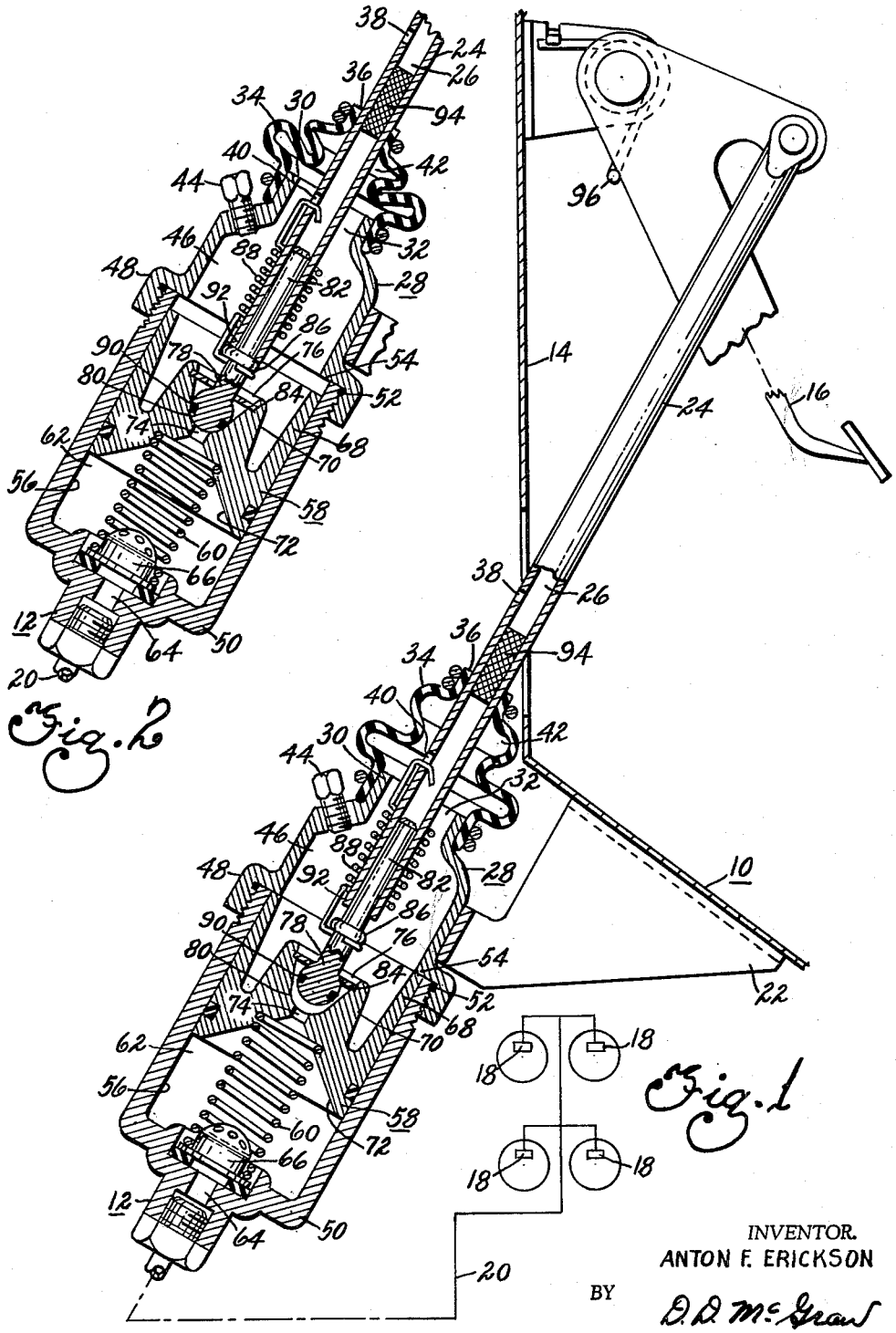
INVENTOR.
ANTON F. ERICKSON
BY
D. D. McGraw
HIS ATTORNEY

3,174,286
MASTER CYLINDER
Anton F. Erickson, Dayton, Ohio, assignor to General Motors Corporation, Detroit, Mich., a corporation of Delaware
Filed June 27, 1963, Ser. No. 291,116
2 Claims. (Cl. 60—54.6)

The invention relates to a fluid pressurizing member, and more particularly to a master cylinder assembly which may be utilized to pressurize a fluid pressure operating component of a vehicle such as the vehicle brakes or clutch. Master cylinders embodying the invention are preferably disposed in a generally vertical position in the vehicle and arranged so that the cylinder may be easily disassembled in position. Features of the invention include a piston and cylinder construction which prevents trapping of air, a tubular push rod venting system, a spring retained floating push rod and compensating valve control arrangement, a combination reservoir and assembly mount and cover, and a seal arrangement for the valve mechanism controlling the compensating port of the cylinder assembly.

In the drawing:

FIGURE 1 illustrates a master cylinder assembly embodying the invention with parts broken away and in section and schematically illustrated as installed in a vehicle to operate the vehicle hydraulic brake system.

FIGURE 2 shows the master cylinder assembly of FIGURE 1 in the fluid pressurizing condition of operation.

The vehicle 10 in which the master cylinder assembly 12 is installed may include a firewall 14 on which is pivotally mounted the brake pedal 16. The vehicle is provided with a hydraulic brake system including wheel cylinders 18 which are pressurized through a fluid conduit system 20 connected with the output of the master cylinder assembly 12. A mounting bracket 22 is suitably attached to the vehicle and to the assembly 12 to hold the assembly in position. A tubular push rod 24 having a passage 26 therein is suitably attached to the brake pedal 16 and is connected to the assembly 12 to operate the assembly.

The assembly 12 includes a cover 28 which also functions as a major portion of the fluid reservoir for the assembly and to which bracket 22 is suitably attached for mounting the unit in position. The upper end 30 of the cover is provided with an opening 32 through which push rod 24 freely extends. A sealing boot 34 is secured to cover upper end 30 and extends upwardly beyond the end to a point 36 where it is suitably secured in sealing relation to the push rod 24. A port 38 extending through one wall of rod 24 opens outside the sealing boot 34 and another similar port 40 in the push rod connects the passage 26 with the chamber 42 contained within the sealing boot 34. Cover 28 is provided with a fluid filling plug 44 through which fluid may be inserted to maintain the reservoir chamber 46 at the desired level. Chamber 46 is formed primarily by and within the cover 28. The lower end 48 of the cover 28 is internally threaded to receive the cylinder housing 50, which is formed as a cup having the open end extending toward the cover 28. A suitable seal 52 is provided between cover 28 and housing 50. A shoulder 54 on cover 28 provides a locating stop for the end of cylinder 50 and extends radially inward relative to the bore 56 of the housing 50 so that it also provides a stop for the pressurizing piston 58 reciprocably received within bore 56. A piston return spring 60 urges piston 58 into engagement with shoulder 54 and is contained within the pressurizing chamber 62 formed by the bore 56 and the lower end of piston 58. An outlet passage 64 formed in the lower end of housing 50 connects chamber 62 with the vehicle brake conduit system 20. A suitable residual pressure maintaining check valve 66 is provided adjacent outlet 64.

Piston 58 has a skirt 68 joined to a centrally positioned boss 70. The lower end of piston 58 is conically inwardly tapered to provide a recess 72 so that air cannot be trapped in the pressure chamber 62 when the piston is positioned so that the highest portion of the recess 72 is at the apex thereof. A compensating port 74 is formed through the piston 58 at the apex of the conical recess 72 so that it is in fluid connecting relation to the reservoir chamber 46. Boss 70 has a recess 76 formed therein on the side facing chamber 46 with compensating port 74 positioned at the bottom thereof. Recess 76 is spherically formed adjacent the bottom so as to receive the ball type port control valve 78 in spherical sealing relation, thus providing a seat 80 for the valve. Valve 78 has a shank 82 extending into the end of passage 26 formed in push rod 24. A snap ring 84 in the outer end of recess 76 retains the valve 78 within the recess. A shoulder 86 on the shank 82 of the floating valve acts as a stop for the end of the push rod 24. Shoulder 86 also functions as a spring retainer for one end of a tension spring 88 which is coiled about the lower end of the push rod 24 and has its other end hooked into the push rod port 40. Valve 78 is also provided with an annular seal 90, which may be an O-ring, to insure a leak-proof sealing engagement of the valve with the piston when the valve is seated. Spring 88 holds valve 78 off the valve seat 80 when the brake pedal 16 is in the full retracted position shown in FIGURE 1.

Under normal conditions of operation the reservoir chamber 46 is filled with fluid to a point slightly below the opening 32 of the cover 28. With the brake pedal in the retracted position, fluid in the reservoir passes around seal 90 and valve 78, through port 74 and into fluid connection with pressurized chamber 62. Due to the orientation of the assembly 12 and the construction of the piston recess 72 no air is trapped in chamber 62. When the brake pedal 16 is applied, push rod 24 moves downwardly a slight amount until its end 92 engages the floating valve shoulder 86. Valve 78 then seats on seat 80, with seal 90 insuring a leak-proof seal, thus closing port 74. Continued movement of pedal 16 causes push rod 24 to push piston 58 downwardly to pressurize the fluid in chamber 62, the force being transferred to the piston through valve shoulder 86, valve shank 82, and the valve 78. This position is shown in FIGURE 2. The change in volume in the reservoir chamber 46 is compensated for by the entry of air through port 38, push rod passage 26, and port 40. A suitable air filter element 94 may be provided in passage 26 intermediate ports 38 and 40. Upon release of the brake pedal 16, piston return spring 60 will move piston 58 upwardly and the brake pedal return spring 96 acts on the brake pedal and the push rod 24 to move the push rod to the fully retracted position. The lower end of spring 88 moves upwardly to engage shoulder 86 and the spring pulls the valve 78 away from its seat 80 so that compensating port 74 is again opened.

This construction eliminates the cross-drilled bypass holes utilized as compensating and by-pass ports in master cylinder units commonly in use today. Scoring of the master cylinder reservoir cups is thereby eliminated, thus overcoming the likelihood of failure of the master cylinders due to scoring of the cups.

In the claims:

1. Fluid pressurizing master cylinder mechanism comprising a housing having a chamber formed therein and a pressurizing member reciprocably received in said chamber to define therewith the pressurizing chamber section, a pressurized fluid outlet formed in said housing and connected with said pressurizing chamber section, a cover for said housing having an assembly mount and having said housing removably secured thereto and cooperating with said housing and said pressurizing member to define a fluid reservoir, a fluid compensating port formed through said pressurizing member to fluid connect said reservoir and said pressurizing chamber, a valve seat formed on the reservoir side of said pressurizing member and receiving said compensating port therethrough, a push rod assembly including a floating valve and push rod element received on one end thereof, said element having a valve portion sealingly engageable with said seat to close said compensating port upon fluid pressurizing actuation of said assembly, a tubular actuating rod forming a part of said push rod assembly, means for disengaging said valve portion from said seat upon full retraction of said actuating rod, means forming a seal between said cover and said actuating rod to seal said reservoir chamber, and reservoir venting means including a first port connecting the upper portion of said reservoir chamber with the interior of said actuating rod and a second passage in said actuating rod beyond said cover and actuating rod sealing means and connecting the interior of said actuating rod with atmosphere.

2. A master cylinder assembly comprising a housing, a chamber formed therein, a pressurizing member movably received in said chamber and dividing said chamber into a fluid pressurizing section and a fluid reservoir section, a fluid compensation port formed in said pressurizing member connecting said chamber sections, a valve having a valve head for opening and closing said port and a valve shank provided with a collar, a push rod having an axial passage therein receiving said valve shank in the end thereof, and spring means acting on said valve and attached to said push rod urging said collar toward the end of said push rod and operable to lift said valve head to open said port upon full retraction of said push rod, said valve collar and shank and head being operable to transmit force from said push rod to said pressurizing member when said port is closed by said valve head.

References Cited by the Examiner
UNITED STATES PATENTS 2,070,298   2/37   Schnell _____ 60—54.6
2,259,019   10/41   Kramer et al. _____ 60—54.6 X
2,758,444   8/56   White _____ 60—54.6

JULIUS E. WEST, *Primary Examiner.*